(12) United States Patent
Ahn

(10) Patent No.: US 9,123,929 B2
(45) Date of Patent: Sep. 1, 2015

(54) SECONDARY BATTERY

(75) Inventor: Chang-Bum Ahn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 596 days.

(21) Appl. No.: 13/485,025

(22) Filed: May 31, 2012

(65) Prior Publication Data

US 2013/0011722 A1    Jan. 10, 2013

(30) Foreign Application Priority Data

Jul. 6, 2011  (KR) .................. 10-2011-0066821

(51) Int. Cl.
*H01M 2/08* (2006.01)
*H01M 2/12* (2006.01)
*H01M 2/06* (2006.01)
*H01M 2/30* (2006.01)

(52) U.S. Cl.
CPC ...... *H01M 2/06* (2013.01); *H01M 2/08* (2013.01); *H01M 2/12* (2013.01); *H01M 2/30* (2013.01)

(58) Field of Classification Search
None
See application file for complete search history.

(56) References Cited

U.S. PATENT DOCUMENTS

2006/0238162 A1 * 10/2006 Cheon et al. .................. 320/112
2012/0077071 A1    3/2012 Jung

FOREIGN PATENT DOCUMENTS

| JP | 2000-067847 | 3/2000 |
|----|-------------|--------|
| JP | 2001-093489 A | 4/2001 |
| JP | 2009-187889 | 8/2009 |
| KR | 2004-0110156 A | 12/2004 |
| KR | 2007-0074390 A | 7/2007 |
| KR | 2008-0045450 A | 5/2008 |
| KR | 10-0891383 | 3/2009 |

OTHER PUBLICATIONS

Machine translation of JP 2001-093489, Apr. 2001.*
Machine translation of KR 1020070074390, Jul. 2007.*

* cited by examiner

*Primary Examiner* — Jonathan Crepeau
(74) *Attorney, Agent, or Firm* — Knobbe Martens Olson & Bear LLP

(57) ABSTRACT

A secondary battery includes an electrode assembly, a case and a tab film. The electrode assembly has first and second electrode tabs formed to protrude therefrom. The case accommodates the electrode assembly so that a portion of at least one of the first and second electrode tabs is exposed to an outside thereof, and has a sealing portion formed along an edge portion thereof. The tab film is formed to surround at least one of the first and second electrode tabs that come in contact with the sealing portion of the case. In the tab film, at least one region of the tab film is formed of a material having a melting point different from that of the other region. Accordingly, the explosion and fire of the secondary battery is prevented, thereby improving the safety of the secondary battery.

17 Claims, 3 Drawing Sheets

SECONDARY BATTERY

RELATED APPLICATIONS

This application claims priority to and the benefit of Korean Patent Application No. 10-2011-0066821, filed on Jul. 6, 2011, in the Korean Intellectual Property Office, the entire content of which is incorporated herein by reference.

BACKGROUND

1. Field

An aspect of the present invention relates to a secondary battery, and more particularly, to a secondary battery having improved safety.

2. Description of the Related Art

As portable wireless devices such as a video camera, a mobile phone, a notebook computer and a potable digital assistant (PDA) become light in weight and multi-functional, the importance of secondary batteries used as driving power sources of these devices has become more important. Since the secondary batteries are rechargeable batteries, they are more economical than disposable batteries.

The secondary batteries may be classified into a cylindrical battery using a cylindrical can, a prismatic battery using a prismatic can, and a pouch-type battery using a thin pouch case, according to the external appearance of a case for accommodating an electrode assembly.

SUMMARY

Embodiments provide a secondary battery in which when the temperature in the inside of a medium- or large-sized secondary battery increases or the pressure of gas is excessively generated, the case seal can be released by opening one region of a tab film formed away from an electrode tab.

According to an aspect of the present invention, there is provided a secondary battery including: an electrode assembly having first and second electrode tabs formed to protrude therefrom; a case that accommodates the electrode assembly so that a portion of at least one of the first and second electrode tabs is exposed to an outside thereof, and has a sealing portion formed along an edge portion thereof; and a tab film formed to surround at least one of the first and second electrode tabs that come in contact with the sealing portion of the case, wherein at least one region of the tab film is formed of a material having a melting point different from that of the other region.

The tab film may have a first tab film formed at a part corresponding to the at least one of the first and second electrode tabs, and a second tab film formed at a part spaced from or not corresponding to the at least one of the first and second electrode tabs.

The second tab film may be formed of a material having a melting point lower than that of the first tab film.

The second tab film may be formed at one or more locations spaced from the at least one of the first and second electrode tabs.

The second tab film may be formed at one of the first and second electrode tabs, which has positive polarity.

The second tab film may not be formed at a part adjacent to the first electrode tab.

The second tab film may be formed in a rectangular shape.

The second tab film may be formed inclined so that the side of the second tab film, which faces the electrode assembly, is distal from the electrode assembly as the side of the second tab film reaches a central portion from both ends thereof.

The first tab film may be formed of polypropylene.

The second tab film may be formed of polyethylene.

The case may be a pouch case.

The pouch case may include an intermediate layer formed of a metal thin film, and insulation layers respectively formed on inner and outer surfaces of the intermediate layer.

The sealing portion of the case may be formed by thermal fusion bonding.

According to the present invention, when the temperature in the inside of a medium- or large-sized secondary battery increases or the pressure of gas is excessively generated, the case seal can be released by opening one region of a tab film formed at a part not corresponding to an electrode tab. Thus, the explosion and fire of the secondary battery can be inhibited, thereby improving the safety of the secondary battery.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
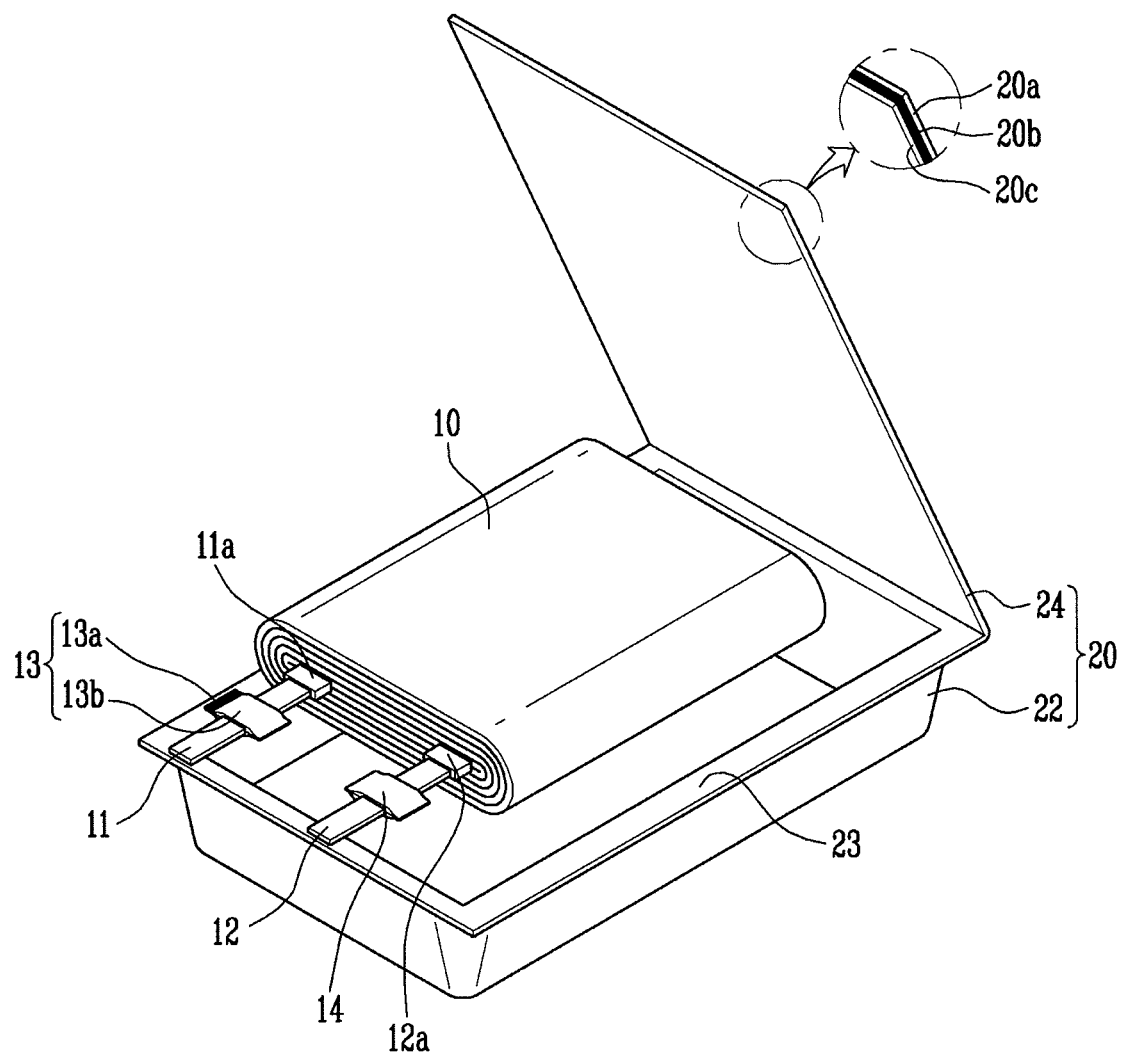
FIG. 1 is an exploded perspective view showing a pouch-type secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 2:
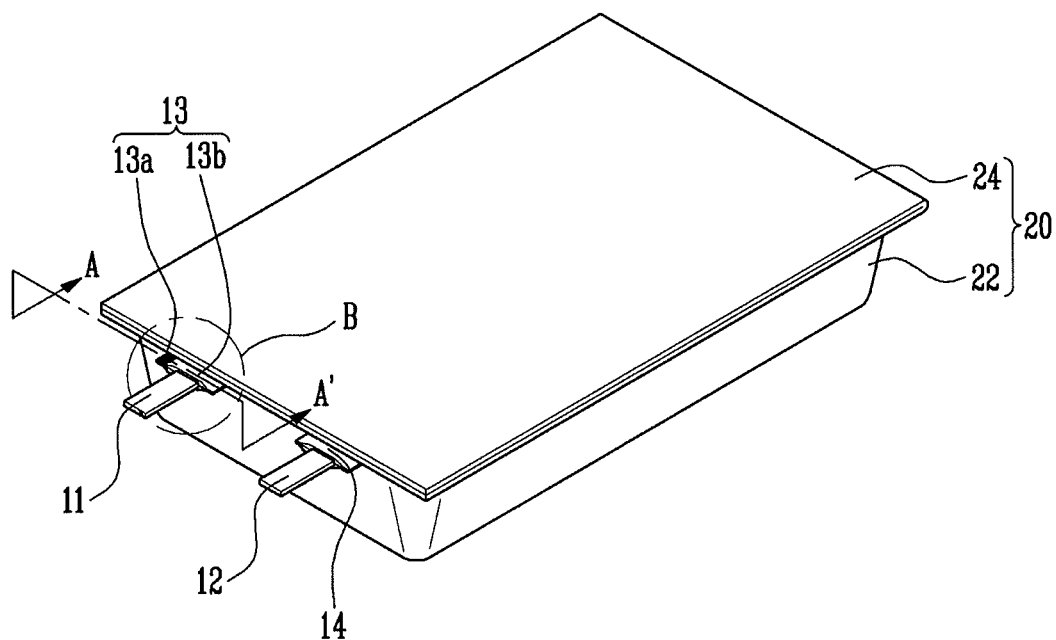
FIG. 2 is a perspective view showing the pouch-type secondary battery according to the embodiment of the present invention.

FIG. 1 is an exploded perspective view showing a pouch-type secondary battery according to an embodiment of the present invention. FIG. 2 is a perspective view showing the pouch-type secondary battery according to the embodiment of the present invention.

Referring to FIGS. 1 and 2, the secondary battery according to this embodiment includes an electrode assembly 10 from which first and second electrode tabs 11 and 12 are formed to protrude, and a pouch case 20 that accommodates the electrode assembly 10.

A first electrode plate, a second electrode plate and a separator interposed therebetween are wound in a jelly-roll shape, thereby forming the electrode assembly 10. Here, the first and second electrode plates are formed by coating first and second active material layers on the surfaces of first and second collectors, respectively, and an electrolyte is impregnated in the separator. When the first electrode plate is formed as a positive electrode plate, the second electrode plate may be formed as a negative electrode plate. It will be apparent that, when the second electrode plate is formed as a negative electrode plate, the second electrode plate may be formed as a positive electrode plate.

Here, it has been illustrated that the electrode assembly 10 is formed by winding the first electrode plate, the second electrode plate and the separator interposed therebetween. However, it will be apparent that the electrode assembly 10 may be formed by stacking the first electrode plate, the second electrode plate and the separator interposed therebetween.

The first electrode tab 11 is connected to the first electrode plate so as to protrude to an upper end portion of the electrode assembly 10, and the second electrode tab 12 is connected to the second electrode plate so as to protrude to an upper end portion of the electrode assembly 10. The first and second electrode tabs 11 and 12 are disposed in parallel at a predetermined interval. The first or second electrode tab 11 or 12 is generally formed of metal such as aluminum, copper or nickel. In order to minimize a voltage drop, the first or second electrode tab 11 or 12 is formed of metal having a certain electric conductivity or more.

Lamination tapes 11a and 12a are wound around portions of the first and second electrode tabs 11 and 12, extracted from the electrode assembly 10, respectively. The lamination tape 11a or 12a shields heat generated from the first or second electrode tab 11 or 12. The lamination tape 11a or 12a allows the electrode assembly 10 not to be pressed by an edge of the first or second electrode tab 11 or 12.

The pouch case 20 is generally formed by folding the center of a rectangular pouch film formed in a single body with respect to the length direction of one side of the pouch film. An accommodating portion 22 is formed at one side of the folded pouch case 20 by press working or the like. The pouch case 20 is sealed by accommodating the electrode assembly 10 in the accommodating portion 22 and then covering the accommodating portion 22 with a cover portion 24. In this instance, a sealing portion 23 may be formed along an edge portion of the pouch case 20 except the folded region.

The pouch film includes an intermediate layer 20b made of an aluminum thin film, and insulation layers 20a and 20c respectively formed on inner and outer surfaces of the intermediate layer 20b. Since the sealing portion 23 is formed by thermal fusion bonding, the inner surface of the pouch case 20 is preferably made of thermal adhesive resin for the purpose of sealing.

Here, the pouch case 20 is exposed so that portions of the first and second electrode tabs 11 and 12 are exposed to the outside of the pouch case 20. Tab films 13 and 14 are respectively formed at parts surrounding the first and second electrode tabs 11 and 12 that come in contact with the sealing portion 23 of the pouch case 20. The tab films 13 and 14 can inhibit short circuits between the pouch case 20 and the first and second electrode tabs 11 and 12.

In this embodiment, at least one region of the tab film 13 formed at the first electrode tab 11 may be formed of a material different from the other region of the tab film 13. More specifically, a first tab film 13b may be formed at a part corresponding to or adjacent the first electrode tab 11, and a second tab film 13a may be formed at a part not corresponding to or spaced from the first electrode tab 11.

Here, the second tab film 13a may be formed of a material having a lower melting point than that of the first tab film 13b. For example, the first tab film 13b may be formed of polypropylene, and the second tab film 13a may be formed of polyethylene. According to this embodiment, the temperature at the part of the positive electrode tab is high in a medium- or large-sized battery, and hence the second tab film 13a is preferably formed at the first electrode tab 11 having positive polarity.

The tab film 14 at the second electrode tab 12 is formed of the same material as the first tab film 13b at the first electrode tab 11.

Generally, when the pressure in the inside of the secondary battery increases due to overcharge, gas is generated, and, the secondary battery may expand or even explode. Particularly, in a lithium ion battery, gas such as carbon dioxide or carbon monoxide is generated while a liquid electrolyte is decomposed due to overcharge, and the pressure in the inside of the battery may be increased. Further, if overcurrent flows due to overdischarge, short circuit or the like, the temperature inside of the battery is increased, and, the liquid electrolyte is changed into gas. Accordingly, the pressure and temperature inside of the battery are increased.

Furthermore, since the width of the sealing portion 23 is large in the medium- or large-sized battery, the time taken for gas to be vented due to the internal pressure is very long. This may result in the pressure and temperature inside of the battery increasing, thereby imperiling the safety of the battery.

In this embodiment, if the secondary battery is expanded due to the generation of gas inside of the secondary battery, the second tab film 13a, having a relatively low melting point bursts and the gas in the inside of the secondary battery can be exhausted. More specifically, where the secondary battery expands due to the generation of gas inside of the secondary battery due to overcharging/overdischarging, etc., the gas in the inside of the secondary battery can be exhausted before fire or explosion inside of the secondary battery occurs.

In other words, if the temperature in the inside of the secondary battery increases to a predetermined temperature or more and then reaches the melting point of the second tab film 13a, the second tab film 13a is melted, and accordingly, the bonding strength of the sealing portion 23, at the location of the second tab film 13a, is lower than other portions of the sealing portion 23. As the bonding strength at this location is lower, the part is weaker against the internal pressure of the secondary battery, and therefore, can burst or otherwise open. Accordingly, the gas in the inside of the secondary battery is exhausted at the location of the second tab film 13a, so that it is possible to inhibit the secondary battery from catching fire or exploding.

Figure 3:
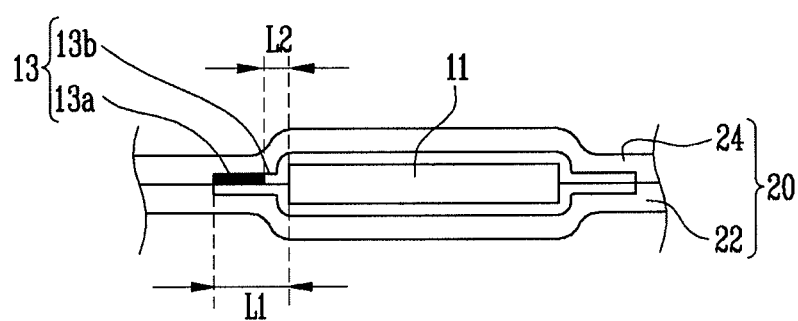
FIG. 3 is a sectional view taken along line A-A' of FIG. 2.

FIG. 3 is a sectional view taken along line A-A' of FIG. 2.

Referring to FIG. 3, the tab film 13 is formed to surround the first electrode tab 11, and extends to both sides of the first electrode tab 11 on a top surface, a bottom surface and two lateral side surfaces. Here, the first tab film 13b is formed at the part surrounding the first electrode tab 11, i.e., the part corresponding to or adjacent the first electrode tab 11. The second tab film 13a is formed at a portion of the part not corresponding to or distal from the first electrode tab 11. In this instance, the second tab film 13a formed distal to the first electrode tab 11 is formed opposite to the first tab film 13b, but may be formed at both sides opposite to each other.

The second tab film 13a is formed at one side distal to the first electrode tab 11 so as to be separated from the first tab 11 by the first tab film 13b that surrounds the first electrode tab 11. The first tab film 13b surrounding the first electrode tab 11 is formed to extend on both sides adjacent to the first electrode tab 11. Since the first tab film 13b is formed of polypropylene and the second tab film 13a is formed of polyethylene having a lower melting point than that of the polypropylene, the second tab film 13a is weaker against heat than the first tab film 13b when the temperature in the inside of the secondary battery increases. Accordingly, the part at which the second tab film 13a is formed bursts or otherwise opens, and therefore, the gas in the inside of the secondary battery may be exhausted.

The second tab film 13a is formed so as to be spaced from the electrode tab 11 with the film 13b interposed therebetween. For example, if the part L1 not corresponding to or spaced from the first electrode tab 11 is formed to have a length of 5 mm, the second tab film 13a is formed to have only a length of 4 mm except 1 mm that is the length of the part L2 adjacent to the first electrode tab 11. This prevents gas in the inside of the secondary battery from being exhausted to the first electrode tab 11 that generates much heat when the gas is exhausted to the part at which the second tab film 13a is formed. Thus, it is possible to inhibit the secondary battery from exploding.

Figure 4A:
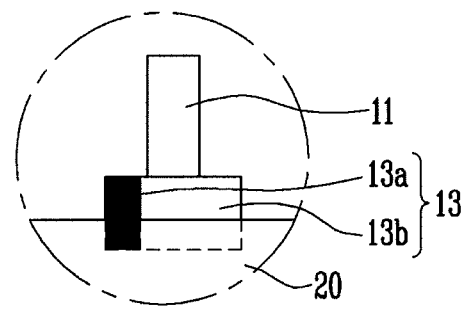
FIG. 4A is an enlarged view showing portion B of FIG. 2.

FIG. 4A is an enlarged view showing portion B of FIG. 2.

Referring to FIG. 4A, the second tab film 13a according to this embodiment may be formed in a rectangular shape. That is, the first tab film 13b and the second tab film 13a having a lower melting point than that of the first tab film 13b are separated from each other, but a side of the second tab film 13a, which is positioned close to the electrode assembly 10 (see FIG. 1), is formed in a straight line. Although the side of the second tab film 13a is formed as described above, the melting point of the second tab film 13a is lower. Hence, if the temperature in the inside of the secondary battery increases to a predetermined temperature and then reaches the melting point of the second tab film 13a, the part of the second tab film 13a bursts earlier than the part of the first tab film 13b, so that the gas in the inside of the secondary battery can be exhausted via the burst part.

Figure 4B:
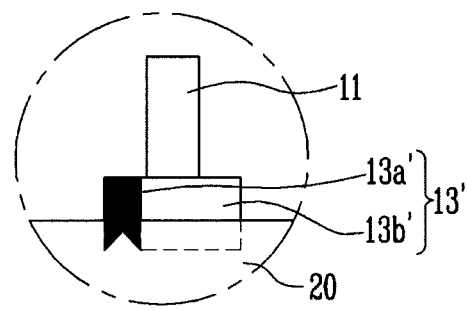
FIG. 4B is an enlarged view showing a tab film according to another embodiment of the present invention.

FIG. 4B is an enlarged view showing a tab film according to another embodiment of the present invention.

Referring to FIG. 4B, in a tab film 13' according to this embodiment, the shape of a first tab film 13b' is formed identically to the first tab film 13b of the aforementioned embodiment, but the shape of a second tab film 13a' is different from the second tab film 13a of the aforementioned embodiment. The second tab film 13a' may be formed inclined so that the side of the second tab film 13a', which faces the electrode assembly 10 (see FIG. 1), is distant from the electrode assembly 10 as the side of the second tab film 13a' reaches a central portion from both ends thereof. Since a lower portion of the second tab film 13a' is formed in the direction in which the pressure of gas generated in the inside of the secondary battery is generated, i.e., the direction in which the gas is exhausted, the part at which the second tab film 13a' is formed can be burst earlier than the first tab film 13b'. Alternatively, the second tab film 13a' has a notch to decrease the thickness to less than the thickness of the first tab film 13b to facilitate bursting or opening of the second tab film 13a. Accordingly, the explosion of the secondary battery can be easily inhibited, thereby improving the safety of the secondary battery.

Figure 5:
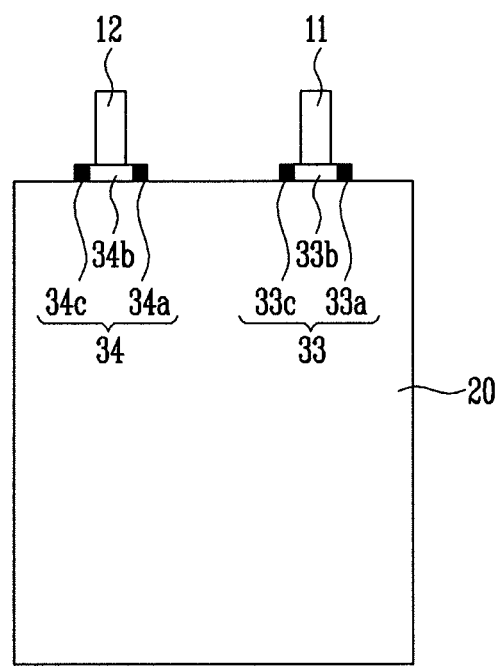
FIG. 5 is a plan view showing a pouch-type secondary battery according to still another embodiment of the present invention.

FIG. 5 is a plan view showing a pouch-type secondary battery according to still another embodiment of the present invention.

In this embodiment, parts at which second tab films 33a, 33c, 34a and 34c can be formed are all shown in FIG. 5. Tab films 33 and 34 are formed to surround first and second electrode tabs 11 and 12, respectively. The tab films 33 and 34 may be divided into parts corresponding to the electrode tabs 11 and 12 and parts not corresponding to or spaced from the electrode tabs 11 and 12, respectively. First tab films 33b and 34b are formed at the parts corresponding to the first and second electrode tabs 11 and 12, respectively. The second tab films 33a, 33c, 34a and 34c may be formed at all the parts not corresponding to or spaced from the first and second electrode tabs 11 and 12. In this instance, the second tab films 33a, 33c, 34a and 34c are not formed at parts adjacent to the electrode tabs 11 and 12.

As described above, the second tab films 33a, 33c, 34a and 34c having a lower melting point than that of the first tab films 33 and 34, so that it is possible to prevent gas from being exhausted to the sides of the electrode tabs 11 and 12 that generate much heat. Accordingly, the explosion of the secondary battery can be inhibited, thereby more improving the safety of the secondary battery.

The second tab film may be selectively formed at one or more of the four parts not corresponding to the first and second electrode tabs 11 and 12 shown in FIG. 5.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
    an electrode assembly having first and second electrode tabs formed to protrude therefrom;
    a case that accommodates the electrode assembly so that a portion of at least one of the first and second electrode tabs is exposed to an outside thereof, and has a sealing portion formed along an edge portion thereof; and
    a tab film formed to surround at least one of the first and second electrode tabs that come in contact with the sealing portion of the case, wherein at least one region of the tab film is formed of a material having a melting point different from that of the other region and wherein the electrode tab has a first width at the location of the sealing portion and the tab film has a second width greater than the first width at the location of the sealing portion temperature region of the tab film is interposed between a lower melting temperature region of the tab film and the outer width of at least one side of the electrode tab so as to physically separate the lower melting temperature region from the electrode tab.

2. The secondary battery according to claim 1, wherein the tab film has a first tab film formed at a part proximal to the at least one of the first and second electrode tabs, and a second tab film formed at a part distal from the at least one of the first and second electrode tabs.

3. The secondary battery according to claim 2, wherein the second tab film is formed of a material having a melting point lower than that of the first tab film.

4. The secondary battery according to claim 2, wherein the second tab film is formed at one or more parts of the part distal not corresponding to the at least one of the first and second electrode tabs.

5. The secondary battery according to claim 4, wherein the second tab film is formed at one of the first and second electrode tabs, which has positive polarity.

6. The secondary battery according to claim 2, wherein the second tab film is spaced from the first electrode tab.

7. The secondary battery according to claim 2, wherein the second tab film is formed in a rectangular shape.

8. The secondary battery according to claim 2, wherein the second tab film is formed inclined so that the side of the second tab film, which faces the electrode assembly, is distant from the electrode assembly as the side of the second tab film reaches a central portion from both ends thereof.

9. The secondary battery according to claim 2, wherein the first tab film is formed of polypropylene.

10. The secondary battery according to claim 2, wherein the second tab film is formed of polyethylene.

11. The secondary battery according to claim 1, wherein the case is a pouch case.

12. The secondary battery according to claim 11, wherein the pouch case comprises an intermediate layer formed of a metal thin film, and insulation layers respectively formed on inner and outer surfaces of the intermediate layer.

13. The secondary battery according to claim 1, wherein the sealing portion of the case is formed by thermal fusion bonding.

14. A secondary battery comprising:
   an electrode assembly having at least one electrode tab;
   a case having a sealing portion that receives the electrode assembly so that a portion of the at least one electrode tab extends outward from the case adjacent the sealing portion;
   a tab film that surrounds the at least one electrode adjacent the sealing portion of the case, wherein tab film includes a first portion and a second portion and wherein the second portion is formed so as to open in response to temperature within the case before the first portion and wherein the electrode tab has a first width at the location of the sealing portion and the tab film has a second width greater than the first width at the location of the sealing portion and wherein the first portion of the tab film is interposed between a second portion of the tab film and the outer width of at least one side of the electrode separate the lower melting temperature region from the electrode tab.

15. The battery of claim 14, wherein the at least one electrode tab comprises a positive electrode tab and a negative electrode tab and wherein the tab film that includes the second portion is formed about the positive electrode tab.

16. The battery of claim 14, wherein the second portion is thinner than the first portion so as to open under pressure or temperature sooner than the first portion.

17. The battery of claim 14, wherein the electrode tab has two lateral sides and the second portion comprises two second portions located on the two lateral sides of the electrode tab.

* * * * *